US008127648B2

(12) United States Patent
Arvey

(10) Patent No.: US 8,127,648 B2
(45) Date of Patent: Mar. 6, 2012

(54) TABLE SAW GUARD SYSTEM

(75) Inventor: Ronald Arvey, Schaumburg, IL (US)

(73) Assignee: Robert Bosch GmbH, Stuttgart (DE)

(*) Notice: Subject to any disclaimer, the term of this patent is extended or adjusted under 35 U.S.C. 154(b) by 711 days.

(21) Appl. No.: 12/221,218

(22) Filed: Jul. 31, 2008

(65) Prior Publication Data

US 2010/0024620 A1 Feb. 4, 2010

(51) Int. Cl.
*B23D 45/06* (2006.01)

(52) U.S. Cl. ...................................... 83/102.1; 83/477.2

(58) Field of Classification Search ................. 83/102.1, 83/477.2

See application file for complete search history.

(56) References Cited

U.S. PATENT DOCUMENTS

| | | | | |
|---|---|---|---|---|
| 307,112 A | | 10/1884 | Groff | |
| 321,484 A | | 7/1885 | Comer | |
| 660,481 A | | 10/1900 | Barnard | |
| 713,196 A | | 11/1902 | Bennett | |
| 1,089,223 A | | 3/1914 | Jenkins | |
| 1,118,477 A | * | 11/1914 | Davis | 83/860 |
| 1,207,683 A | | 12/1916 | Coyle | |
| 1,244,187 A | | 10/1917 | Frisbie | |
| 1,258,961 A | | 3/1918 | Tattersall | |
| 2,007,887 A | | 7/1935 | Tautz | |
| 2,530,867 A | | 11/1950 | Galanga | |
| 3,348,836 A | | 10/1967 | Smierciak | |
| 3,566,934 A | | 3/1971 | Thrasher | |
| 4,076,227 A | | 2/1978 | Rameson | |
| 4,615,247 A | | 10/1986 | Berkeley | |
| 4,625,604 A | | 12/1986 | Handler et al. | |
| 4,721,023 A | | 1/1988 | Bartlett et al. | |
| 4,805,505 A | | 2/1989 | Cantlin | |
| 5,156,508 A | | 10/1992 | Grisley | |
| 5,201,863 A | | 4/1993 | Peot | |
| 5,235,752 A | * | 8/1993 | Sauerwein et al. | 30/377 |
| 5,287,779 A | | 2/1994 | Metzger, Jr. | |
| 5,287,780 A | * | 2/1994 | Metzger et al. | 83/102.1 |
| 5,447,085 A | | 9/1995 | Gochnauer | |
| 5,979,523 A | | 11/1999 | Puzio et al. | |
| 6,131,629 A | | 10/2000 | Puzio et al. | |
| 6,170,370 B1 | | 1/2001 | Sommerville | |

(Continued)

FOREIGN PATENT DOCUMENTS

| | | |
|---|---|---|
| DE | 910835 | 3/1954 |

(Continued)

OTHER PUBLICATIONS

"Elektra Beckum®" TS 250' Operating Instructions, Metabo, Germany, pp. 14-23.

(Continued)

*Primary Examiner* — Kenneth E. Peterson
(74) *Attorney, Agent, or Firm* — Greer, Burns & Crain, Ltd.

(57) ABSTRACT

A power table saw having a table top surface with an opening through which a blade can extend, the blade being mounted on an arbor and being at least vertically adjustable relative to the top surface, the table saw comprising a blade assembly having a first pivot connection and being pivotally mounted to the table saw enabling the blade to be vertically adjusted through a predetermined arc relative to the table top and a riving knife mounted on the blade assembly and being vertically moveable in a substantially straight direction as the blade is vertically adjusted through the predetermined arc.

14 Claims, 5 Drawing Sheets

U.S. PATENT DOCUMENTS

| | | | | |
|---|---|---|---|---|
| 6,405,624 | B2 | 6/2002 | Sutton | |
| 6,502,809 | B1 | 1/2003 | Gionta | |
| 6,578,460 | B2 | 6/2003 | Sartori | |
| 6,644,157 | B2 | 11/2003 | Huang | |
| 6,736,042 | B2 | 5/2004 | Behne et al. | |
| 6,840,144 | B2 | 1/2005 | Huang | |
| 6,986,370 | B1 | 1/2006 | Schoene et al. | |
| 7,137,327 | B2 | 11/2006 | Garcia et al. | |
| 7,210,386 | B1 | 5/2007 | Chang | |
| 7,458,301 | B2 * | 12/2008 | Yu | 83/102.1 |
| 2001/0035081 | A1 | 11/2001 | Sutton | |
| 2002/0029822 | A1 | 3/2002 | Jukoff | |
| 2004/0011177 | A1 | 1/2004 | Huang | |
| 2004/0103544 | A1 | 6/2004 | Hartmann | |
| 2004/0118261 | A1 | 6/2004 | Garcia et al. | |
| 2004/0255745 | A1 | 12/2004 | Peot et al. | |
| 2004/0261592 | A1 | 12/2004 | Chen | |
| 2005/0087049 | A1 | 4/2005 | Miller et al. | |
| 2005/0160895 | A1 | 7/2005 | Garcia et al. | |
| 2005/0166736 | A1 | 8/2005 | Gass et al. | |
| 2005/0188807 | A1 | 9/2005 | Parks et al. | |
| 2005/0211034 | A1 | 9/2005 | Sasaki et al. | |
| 2006/0011034 | A1 | 1/2006 | Gehret et al. | |
| 2006/0032355 | A1 | 2/2006 | Wang | |
| 2006/0042441 | A1 | 3/2006 | Ichikawa et al. | |
| 2006/0096428 | A1 | 5/2006 | Garcia et al. | |
| 2006/0101962 | A1 | 5/2006 | Garcia | |
| 2006/0260456 | A1 | 11/2006 | Chang | |
| 2007/0074613 | A1 | 4/2007 | Yu | |
| 2007/0227327 | A1 * | 10/2007 | Liu et al. | 83/477.2 |

FOREIGN PATENT DOCUMENTS

| | | |
|---|---|---|
| DE | 917746 | 7/1954 |
| DE | 11 67 511 | 4/1964 |
| DE | 2364910 | 7/1975 |
| DE | 2917497 | 11/1980 |
| DE | 3137732 | 6/1983 |
| DE | 3315169 | 11/1983 |
| DE | 8807584 | 9/1988 |
| DE | 9306198 | 9/1993 |
| EP | 0012404 | 6/1980 |
| EP | 0605998 | 7/1994 |
| EP | 0633105 | 1/1995 |
| EP | 1491304 | 12/2004 |
| FR | 2239325 | 2/1975 |
| GB | 2273078 | 6/1994 |
| JP | 2005-262337 | 9/2005 |

OTHER PUBLICATIONS

"Powermatic®" Model 2000 Operating Instructions and Parts Manual, WMH Tool Group, Revision B Apr. 2006. pp. 1-43.

"Powermatic®" Model 2000 Operating Instructions and Parts Manual, WMH Tool Group, Revision A Nov. 2005. pp. 1-43.

Bosch 4000 Operating Instructions, 2007.

Roland Johnson, "10-in. Cabinet Saws", *Fine Woodworking*, May/Jun. 2006, pp. 46-51.

* cited by examiner

TABLE SAW GUARD SYSTEM

BACKGROUND OF THE INVENTION

The present invention generally relates to power tools and, more particularly, to power table saws.

Power table saws typically have guard systems that either attach to the undercarriage of the table saw, to the rear of the table saw or to some structure above the table saw. In each of these configurations there are typically three components, namely, a splitter or riving knife, a kickback prevention device, (often called kickback dawgs) and a blade guard that covers the blade. A riving knife is a safety device that reduces the likelihood of a kick-back event where a work piece is somehow caught or bound up during a cutting operation and the inertia of the blade throws the work piece back toward the user.

A blade guard mechanism that is configured to be releasably attached to the riving knife can comprise an upper guard barrier oriented generally horizontally, i.e., preferably parallel to the table. The mechanism has a mounting portion that includes a quick release mechanism and a pair of side barriers that are pivotally attached to the mounting portion.

Such a blade guard construction is disclosed in application Ser. No. 11/890,891 filed Aug. 8, 2007 and entitled MODULAR TABLE SAW GUARDING SYSTEM UPPER GUARD BARRIER, which is specifically incorporated by reference herein.

There are table saw guard standards that have been established by Underwriters Laboratory Standard 987, section 40, which is scheduled to go into effect in the year 2010. The standard requires that a table saw riving knife maintain a standard spacing away from the table saw blade and support the guard through its range of motion. Present table saw guard systems which utilize a riving knife and which meet the 2010 standards have a mechanism which moves the entire motor and blade vertically to accomplish the various blade height positions. These designs are effective, but are relatively expensive compared to a pivoting mechanism that move the blade and motor through an arc to accomplish various blade height positions.

Such pivoting designs are typically lower in cost. In order to meet the regulatory standards, it is necessary to move the riving knife vertically while the blade and motor move through an arc defined by the motor pivoting mount.

SUMMARY OF THE INVENTION

Embodiments of the present invention are directed to a power table saw having a table top surface with an opening through which a blade can extend, the blade being mounted on an arbor and being at least vertically adjustable relative to the top surface, the table saw comprising a blade assembly having a first pivot connection and being pivotally mounted to the table saw enabling the blade to be vertically adjusted through a predetermined arc relative to the table top and a riving knife mounted on the blade assembly and being vertically moveable in a substantially straight direction as the blade is vertically adjusted through the predetermined arc.

PREFERRED EMBODIMENT OF THE PRESENT INVENTION

Figure 1:
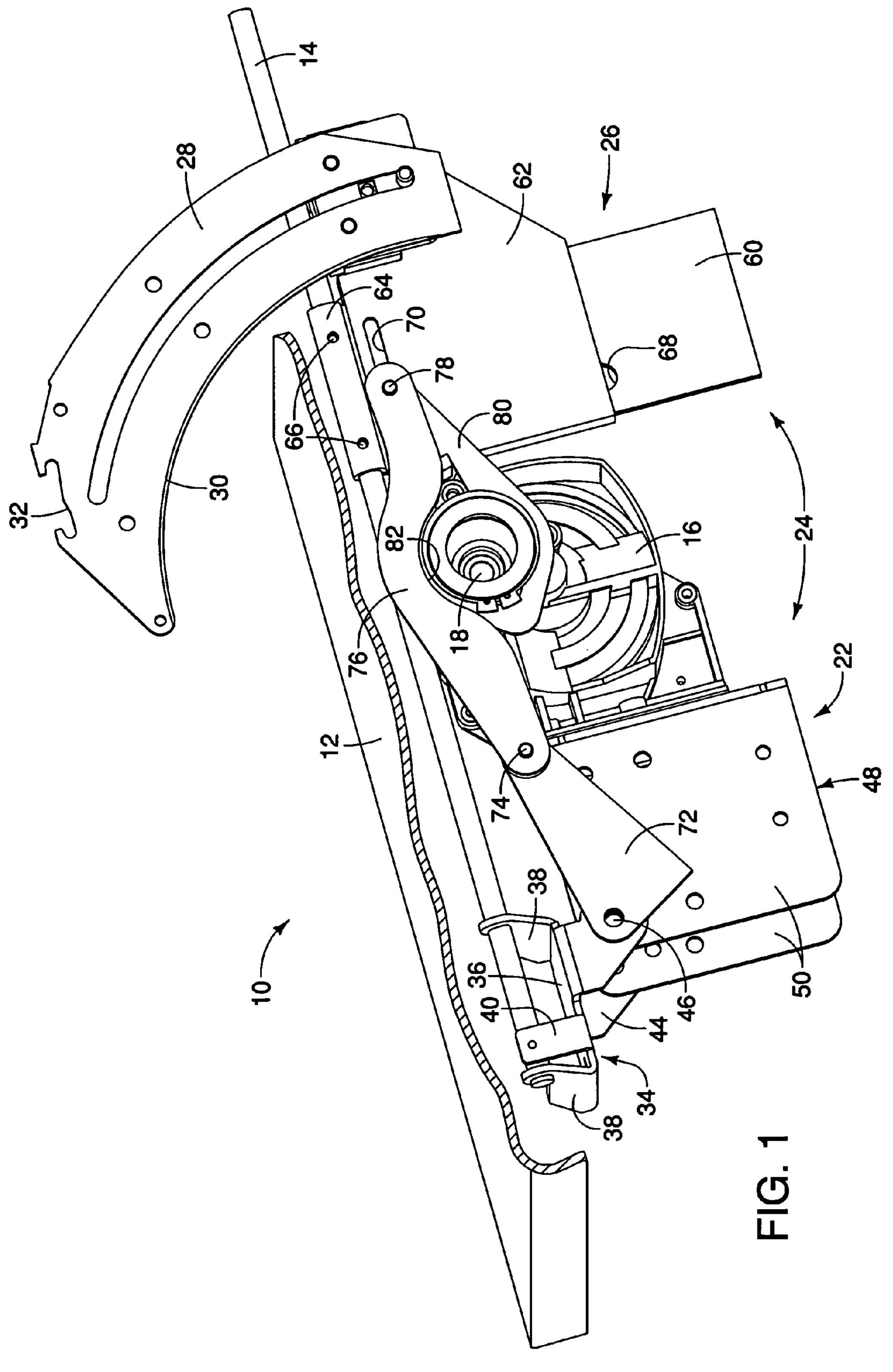
FIG. 1 is a perspective view of a portion of a table saw that is a preferred embodiment of the present invention, shown with portions removed.
Figure 2:
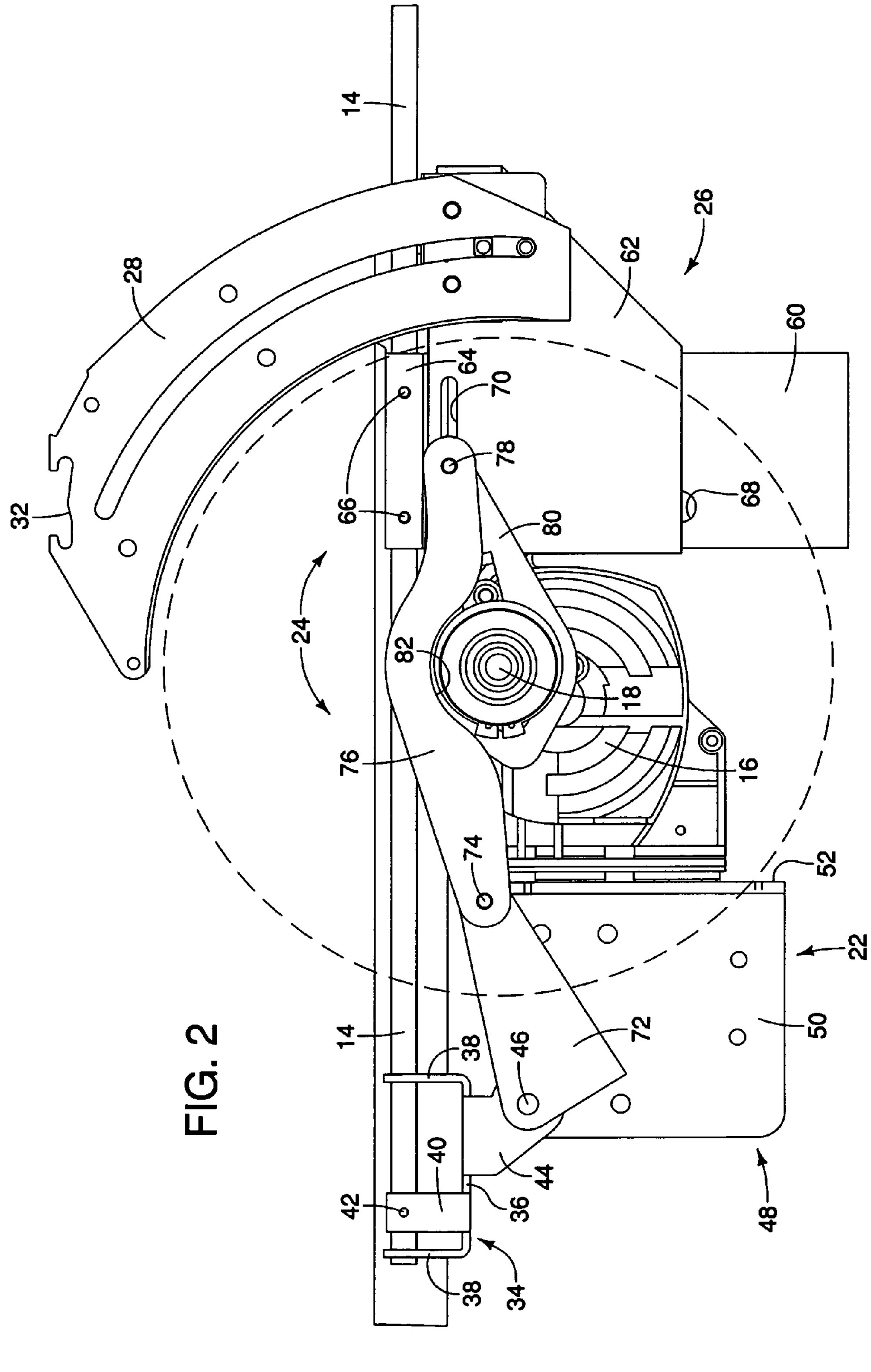
FIG. 2 is a side view of the embodiment shown in FIG. 1 and particularly illustrating the motor and blade in its fully elevated position.

A preferred embodiment of a table saw having a guard system is shown in the drawings and will be described herein. It should be understood that the table saw is not illustrated in its entirety inasmuch as the mechanism for actually adjusting the position of the motor and blade of a table saw is not described in detail, nor is the mechanism which is used to adjust the bevel angle of the blade described in detail. Moreover, a riving knife is disclosed in the drawings in connection with an outline of the blade, but the blade guard itself is not illustrated in the drawings for the reason that the invention resides in the interrelationship between a blade assembly (which includes the saw motor) and the riving knife.

Turning now to the drawings, a table saw is indicated generally at 10, which has a table top surface 12 and elongated rod 14 that is rotatable about its central axis and is connected to the table saw using support brackets well known to those of ordinary skill in the art. The saw 10 includes a motor 16 that includes a gear set having an output shaft that comprises an arbor 18 of a blade 20 shown in phantom in FIGS. 2-5.

The motor is mounted to the saw by a motor mount bracket assembly, indicated generally at 22. The motor mounting bracket assembly 22 is operably connected to a blade assembly, indicated generally at 24, which includes a guard bracket assembly, indicated generally at 26, to which a riving knife 28 can be removably installed. The riving knife 28 preferably has a thickness that approximates the thickness of the blade 20 and has an adjacent inner curved surface 30 that is substantially similar to the curvature of the outer reach of the blade 20.

The top of the riving knife 28 is an elongated slot 32 having hook portions at opposite ends thereof which are configured to receive a quick connect mechanism of a blade guard structure so that the blade guard structure can be easily removed from the riving knife 28 if desired. By virtue of the adjustability of the motor mounting bracket assembly, the blade and riving knife can be vertically adjusted relative to the table top 12. Also, the motor mounting bracket assembly 22 as well as the guard bracket assembly 24 are preferably directly mounted to the rod 14 so that the blade 20 can be angularly adjusted to make cuts at an angle other than 90° relative to the table top 12, if desired.

Referring to the motor mounting bracket assembly 22, it comprises a fixed bracket, indicated generally at 34, which includes a horizontal base portion 36, a pair of upturned ends 38, each of which has a circular opening through which the rod 14 can pass. A center extension 40 is connected to the base portion 36 that is secured to the rod 14 by a bolt 42, or other fastening device such as a screw, pin or the like. The ends 38 support the bulk of the weight of the motor mounting bracket assembly 22, which includes the motor 16, and the center extension 40 connection prevents the fixed bracket 34 from rotating relative to the rod 14.

Thus, when the rod 14 is rotated, the fixed bracket 34 is rotated which also rotates the motor 16 and the blade 20. The fixed bracket also has downwardly extending sides 44 which have a pivot connection 46 which connects the sides 44 to a motor support bracket indicated generally at 48. As is best shown in FIG. 1, the motor support bracket is generally U-shaped, with side portions 50 and a base portion 52 to which the motor is mounted. It is therefore evident that the pivot connection 46 enables the motor support bracket 48 to be rotated relative to the fixed bracket and thereby vertically adjust the motor 16 and blade 20 relative to the table top 12. It should also be appreciated that the pivot connection 46 is the pivot around which the motor support bracket 48, motor and blade rotate and therefore the arc is established relative to this pivot connection 46.

The blade assembly 24 includes the guard bracket assembly 26 which comprises a guard mounting bracket 60 and a sliding pivot bracket 62. The top portion 64 of the guard mounting bracket 60 is attached to the rod 14 with two bolts 66, although other fasteners such as screws, pins or the like could be used. The attachment prevents rotation of the guard mounting bracket 60 relative to the rod 14. The sliding pivot bracket 62 is configured to be interconnected with the guard mounting bracket 60 but is vertically movable relative thereto.

Figure 3:
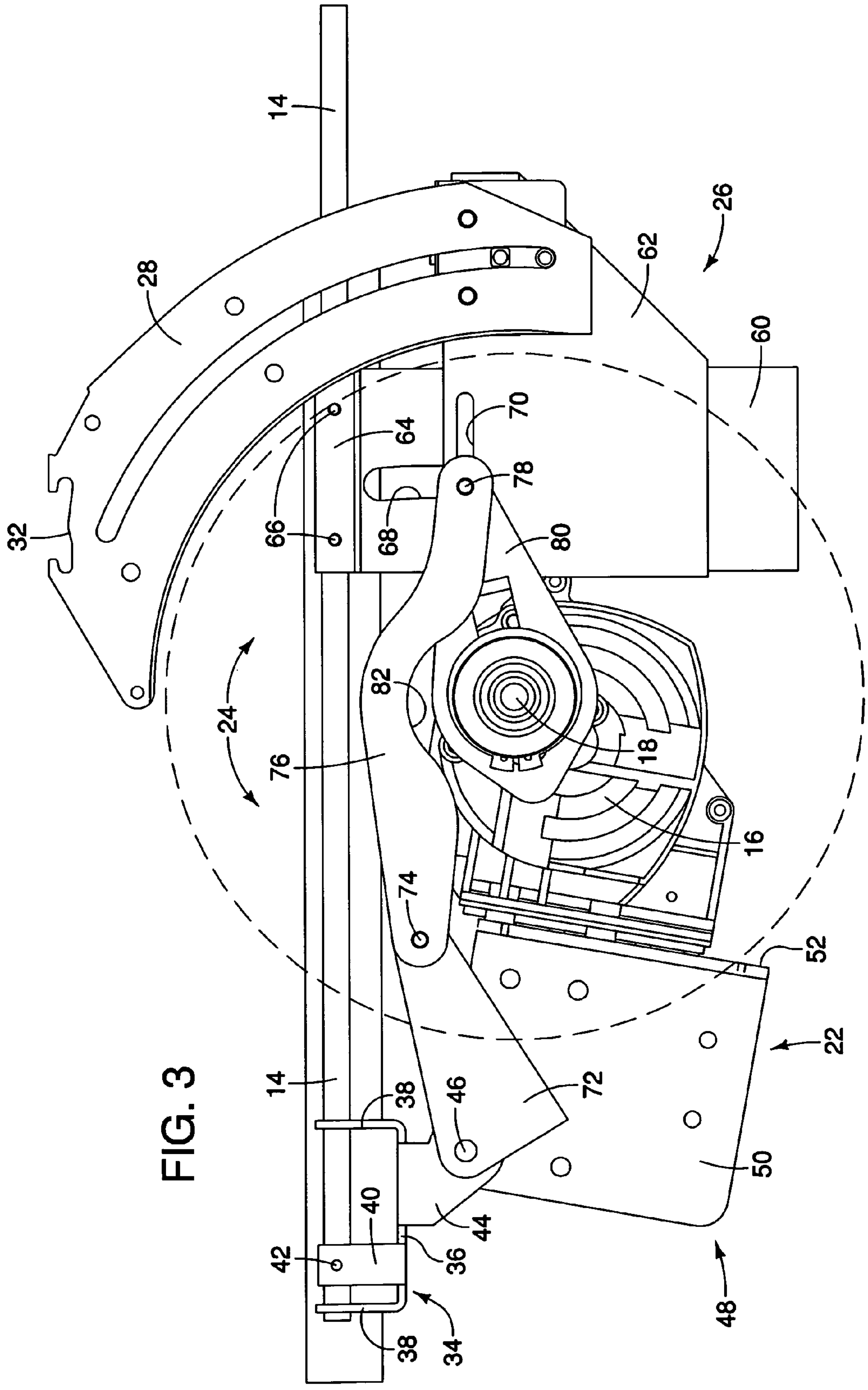
FIG. 3 is a side view similar to FIG. 2, but particularly illustrating the blade and motor in a slightly lower position.
Figure 4:
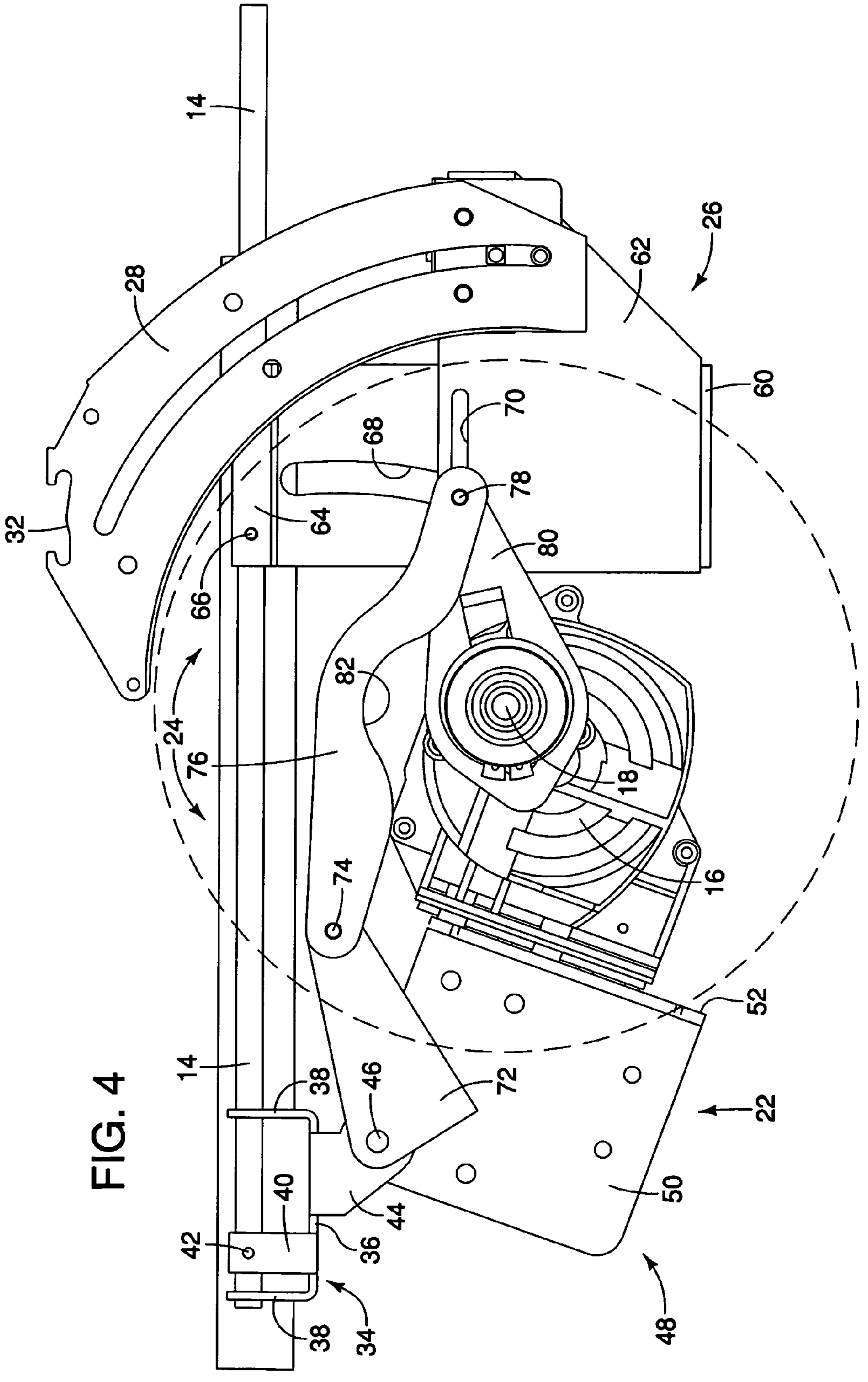
FIG. 4 is a side view similar to FIGS. 2 and 3, but illustrating the motor and blade in a further lower position.
Figure 5:
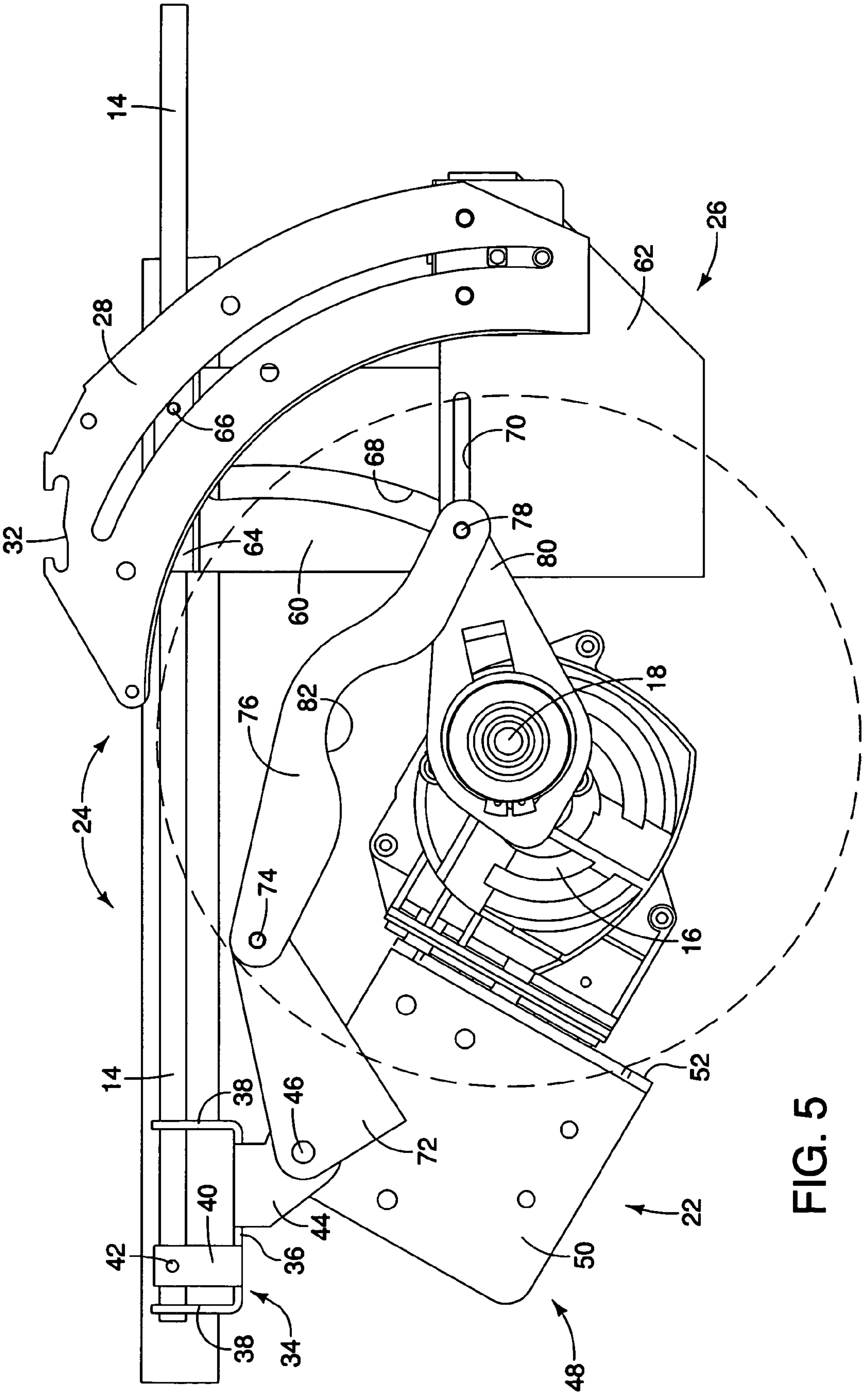
FIG. 5 is a side view similar to FIGS. 2-4, but showing the blade and motor in its lowermost position.

The guard mounting bracket 60 has a curved slot 68 best shown in FIGS. 3-5, the curvature of which corresponds to the arc that would be generated by a circle having a radius originating from the pivot connection 46 and extending to the slot 68. The sliding pivot bracket 62 also has a horizontal slot 70.

The blade assembly 24 also comprises a fixed arm 72 that is fixedly connected at its left end as shown in the drawings to the sides 44 of the fixed bracket 34 and has a pivot connection 74 at its right end. The connection of the fixed arm 72 to the sides 44 can be made by welding the two together, or they can be bolted or otherwise attached by suitable fasteners. Alternatively, the fixed bracket 34 may be fabricated with the fixed arm 72 being an integral part of the sides 44 thereof.

The pivot connection 74 is also connected to the left end of a pivoting link arm 76, the right end of which has a pivot connection 78. The blade assembly 24 also includes a cylindrical hub and outwardly extending arm 80. The hub is rotatable around the arbor 18 and the arm extends from the hub to the pivot connection 78. The pivot connection 78 extends through the horizontal slot 70 as well as the curved slot 68. All of the pivot connections are bolts, pins, sleeves or other suitable structures that permit rotational movement, are strong and have good wear characteristics.

As is evident from the drawings, the link arm 76 has a recess or cut out portion 82 so that it does not interfere with the hub and arm 80. Since the sliding pivot bracket 62 can only move in a vertical direction, the blade assembly 24 is the mechanism that moves the sliding pivot bracket 62 in a vertical direction by virtue of the fact that the pivot connection 78 rides in the horizontal slot 70. Thus, when the pivot connection 78 is moved vertically, it will move the sliding pivot bracket 62 which necessarily vertically adjusts the position of the riving knife 28. Also, the pivot connection 78 also rides in the slot 68 as the motor 16 is moved through its arc.

As is best shown in FIG. 5, the components of the blade assembly 24 which include the fixed arm 72, link arm 76 and hub and arm 80 which are connected as described and which include pivot connections 46, 74, 78 and the arbor 18 define a parallelogram linkage. The parallelogram linkage that is illustrated in the drawings is a parallelogram with equal arms because the distance between the pivot connection 46 and the hub 18 is substantially equal to the distance between the pivot connection 74 and 78. Also, the distance between the hub 18 and the pivot connection 78 is substantially equal to the distance between the pivot connections 46 and 74. It should be understood that other embodiments of the present invention can use a parallelogram linkage having unequal arms.

A comparison of the positions of the blade assembly 24 components shown in FIGS. 2, 3, 4 and 5 illustrate that as the motor 16 travels through its arc of movement, the parallelogram linkage causes the sliding pivot bracket 62 to be moved vertically as is desired. A mechanism (not shown) is connected to the motor support bracket 48 which adjusts its angle relative to the fixed bracket 34 to adjust the height of the blade 20 relative to the table top 12.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power table saw having a table top surface with an opening through which a blade can extend, the blade being mounted on an arbor and being at least vertically adjustable relative to the top surface, the table saw comprising:

a blade assembly including;

- a first pivot connection enabling the blade assembly to be pivotally mounted to the table saw and the blade to be vertically adjusted through a predetermined arc relative to the table top,
- a guard mounting bracket attached to said table saw and having a curved slot with a curvature corresponding to said predetermined arc,
- a sliding pivot bracket mounted on said guard mounting bracket and having a straight slot extending generally parallel to the table top surface,
- a second pivot connection configured to slide in said curved slot and said straight slot, simultaneously, to move said sliding pivot bracket in a straight perpendicular direction relative to the table top surface; and a riving knife mounted on said sliding pivot bracket and being vertically moveable in a substantially straight direction as the blade is vertically adjusted through said predetermined arc.

2. A power table saw as defined in claim 1 wherein said blade assembly comprises a motor for driving the blade, said blade assembly further comprising a motor mounting bracket assembly for mounting said motor thereto.

3. A power table saw as defined in claim 2 further comprising an elongated rod that is rotatable around its center axis, said blade assembly and said guard mounting bracket being attached thereto, rotation of said rod adjusting the angle of the blade relative to the table top surface for making bevel cuts in a work piece.

4. A power table saw as defined in claim 3 wherein said guard mounting bracket is attached to said rod by placing one or more fasteners through said guard mounting bracket into apertures in said rod.

5. A power table saw as defined in claim 2 wherein said motor mount bracket assembly further comprises a fixed bracket operatively attached to said rod and a motor support bracket to which said motor is mounted, said motor support bracket being pivotally connected to said fixed bracket by said first pivot connection.

6. A power table saw as defined in claim 5 wherein said fixed bracket has openings through which said rod pass to support said bracket and includes a portion that is configured to be bolted to said rod to prevent rotation of said fixed bracket relative to said rod.

7. A power table saw as defined in claim 2 wherein said blade assembly further comprises:

an elongated arm having one end portion fixedly connected to said fixed bracket and a second end portion with a third pivot connection;

a pivoting link arm having a first end portion pivotally connected to said third pivot connection and a second end portion with said second pivot connection; and a cylindrical hub rotatably mounted around the blade arbor and having an outwardly extending arm that is pivotally connected to said second pivot connection.

8. A power table saw as defined in claim 7 wherein the distance between said second and third pivot connections is substantially the distance between the first connection and the center of said blade arbor and the distance between said first and third pivot connections is substantially the distance between said second pivot connection and the center of said blade arbor, the first, second, third pivot connections and the center of said blade arbor defining a parallelogram linkage.

9. A power table saw as defined in claim 8 wherein said motor support bracket has a generally U-shaped configuration with said motor being attached thereto at the base portion of said U-shaped configuration.

10. A power table saw as defined in claim 7 wherein said pivoting link arm is elongated and has a cutout portion adjacent to said cylindrical arm to prevent interference between said link arm and said cylindrical arm.

11. A power table saw as defined in claim 1 wherein said riving knife has a thickness approximating the thickness of the blade and a length that extends from the top surface to at least near the height of the blade, said riving knife having a general curvature corresponding to the curvature of the blade.

12. A power table saw as defined in claim 11 wherein the distance between the inside surface of the riving knife and the outer reach of the blade is no greater than about 3 mm to about 8 mm when the blade is above the table top surface.

13. A power table saw having a table top surface with an opening through which a blade can extend, the blade being mounted on an arbor and being at least vertically adjustable relative to the top surface, the table saw comprising:

a blade assembly enabling the blade arbor to be vertically adjusted through a predetermined arc relative to the table top, a guard mounting bracket attached to said table saw and providing a support for a sliding pivot bracket;

a sliding pivot bracket mounted on said guard mounting bracket and being movable in a straight vertical direction; and a riving knife mounted on said sliding pivot bracket;

wherein said blade assembly comprises a parallelogram linkage for moving said sliding pivot bracket in a straight line vertical direction responsive to movement of said blade arbor through said predetermined arc.

14. A power table saw as defined in claim 13 wherein said blade assembly and said guard mounting bracket are operatively connected to a rotatable rod mounted to said table saw, rotation of said rod adjusting the angle of the blade relative to the table top surface for making bevel cuts in a work piece.

* * * * *